March 5, 1957  H. HOLMQUIST  2,783,583
ADJUSTABLE TUBE LEGS
Filed Jan. 15, 1954

Inventor
H. Holmquist 2,783,583

ADJUSTABLE TUBE LEGS

Hjalmar Holmquist, Danderyd, Sweden

Application January 15, 1954, Serial No. 404,184

Claims priority, application Sweden January 17, 1953

2 Claims. (Cl. 45—139)

The present invention relates to a device for adjusting the height of tube legs.

According to the invention, the lower end of the tube leg is provided with inner or outer threads, and on and in the end of the tube, a tube piece or a bolt provided with the corresponding threads is screwed on, said tube piece or bolt being provided with transverse holes in which a pin can be inserted, which pin also can be inserted into holes or slots in a loop which may be fastened to the floor, or into the tube leg.

Figure 1:
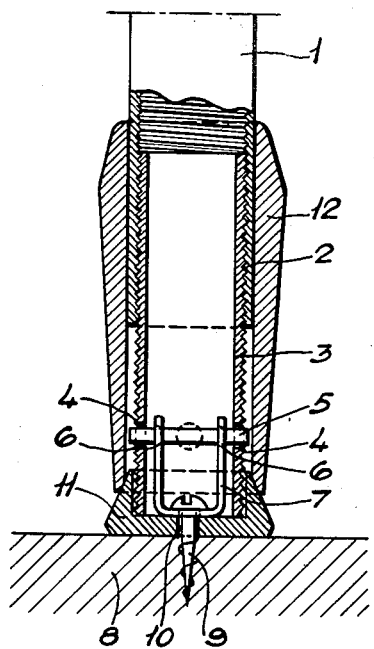
Figure 2:
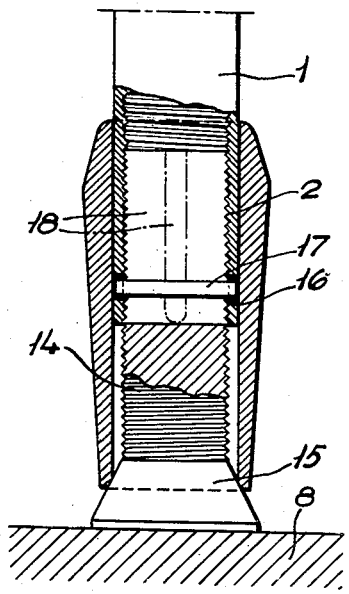

The invention is illustrated by a couple of embodiments in the accompanying drawing in which, Fig. 1 is a longitudinal section of a tube leg according to the invention, and Fig. 2 is a longitudinal section of another embodiment.

Referring now to the drawing 1 designates a tube leg, which is provided at the lower end with threads 2 in which is screwed a tube piece or a bolt 3 which near its lower end is provided with diametrically opposed transverse holes 4 through which a pin 5 is threaded. The pin also passes through holes 6 in a U-shaped loop 7 which is screwed to the floor 8 by means of a screw 9, the screw passing also through a central hole 10 in a cup-shaped protective socket 11 provided between the tube piece 3 and the floor.

A sleeve 12 which is freely displaceable upwards and has for its function to screen the tube piece 3 and the loop 7 is provided about the lower end of the tube leg 1.

When the height of the tube leg is to be adjusted, the sleeve 12 is lifted and the pin 5 is removed, whereafter the tube piece 3 is screwed in respectively until the desired height is obtained. The pin 5 is replaced in the holes and the sleeve 12 is again moved downward until its lower edge rests against the socket 11.

According to Fig. 2, 14 designates a bolt screwed in the inside threads 2 of the lower part of the tube leg 1, said bolt having an extended portion 15 at the lower end.

Through diametrical holes 16 in the tube leg, a pin 17 is threaded, which pin also goes through a diametrical axial slot 18 in the bolt. It is evident that instead, a diametrical hole can be provided in the bolt and that diametrically located longitudinal slots can be provided in the tube leg.

A sleeve 12 is threaded on the lower end of the tube leg, the lower edge of said sleeve resting against the extension 15 of the bolt 14.

The invention also relates to corresponding arrangements in massive legs with a tubular lower end.

Having now described my invention what I claim as new and desire to secure by Letters Patent is:

1. A vertically adjustable supporting leg comprising a tubular body having a threaded portion at the lower end thereof, a tube threadedly engaging the threaded portion of the tubular body, the position of the tube relative to the tubular body determining the height of the supporting leg, said tube being provided with diametrically opposed openings, a U-shaped bracket located within the tube and attached to a supporting surface, the legs of the U-shaped bracket having apertures in registry with the openings in the tube, and a transversely extending pin lodged in said openings and apertures preventing rotation of the tube with respect to the tubular body.

2. A vertically adjustable supporting leg as defined in and claimed by claim 1 further characterized in that a protective socket attached to the lower end of the tube is positioned between the U-shaped bracket and the supporting surface.

References Cited in the file of this patent

UNITED STATES PATENTS

| | | |
|---|---|---|
| 563,241 | Wood | June 30, 1896 |
| 1,025,707 | Meyer et al. | May 7, 1912 |
| 1,056,785 | Finney | Mar. 25, 1913 |
| 1,118,974 | Ulrich et al. | Dec. 1, 1914 |
| 1,875,588 | Golden et al. | Sept. 6, 1932 |
| 2,010,299 | Gray | Aug. 6, 1935 |